United States Patent [19]
Sogo

[11] Patent Number: 5,631,586
[45] Date of Patent: May 20, 1997

[54] SINE-WAVE GENERATOR CIRCUIT

[75] Inventor: Akira Sogo, Hamamatsu, Japan

[73] Assignee: Yamaha Corporation, Hamamatsu, Japan

[21] Appl. No.: 582,671

[22] Filed: Jan. 4, 1996

[30] Foreign Application Priority Data

Jan. 6, 1995 [JP] Japan ................... 7-016453

[51] Int. Cl.$^6$ ........................... G06F 1/02
[52] U.S. Cl. ............... 327/106; 327/129; 364/721
[58] Field of Search ..................... 327/105, 106,
327/107, 129; 375/268, 271, 272, 300,
302; 364/721, 736–741; 371/40.1, 40.2;
395/183.18, 182.03

[56] References Cited

U.S. PATENT DOCUMENTS

| | | | |
|---|---|---|---|
| 4,486,846 | 12/1984 | McCallister et al. | 364/721 |
| 4,628,240 | 12/1986 | Kurakake et al. | 318/723 |
| 4,752,902 | 6/1988 | Goldberg | 364/721 |
| 5,039,872 | 8/1991 | Oldham | 327/106 |
| 5,113,361 | 5/1992 | Damerow et al. | 364/721 |
| 5,126,960 | 6/1992 | Thong | 364/721 |
| 5,187,677 | 2/1993 | Kovalick | 364/721 |
| 5,255,288 | 10/1993 | Ichihara | 327/106 |
| 5,382,924 | 1/1995 | Pardoen et al. | 332/100 |
| 5,406,584 | 4/1995 | Erisman | 375/45 |
| 5,467,294 | 11/1995 | Hu et al. | 364/721 |
| 5,469,479 | 11/1995 | Chang et al. | 375/377 |

*Primary Examiner*—Timothy P. Callahan
*Assistant Examiner*—My-Trang Nu Ton
*Attorney, Agent, or Firm*—Loeb & Loeb LLP

[57] ABSTRACT

A sine-wave generator circuit is provided to generate data representative of a sine wave by using a ROM which stores sine-wave data of only a selected phase region between 0 and $\pi/2$, for example. The circuit receives input phase data which are represented by twos complements and whose low-order bits are used as address data for the ROM; and each bit of the input phase data has a specific weight factor. When reading out data from the ROM, a normal order or a reverse order for the address data is designated in accordance with high-order bits of the input phase data, so that data representative of other phase regions are generated based on output of the ROM. Then, phase adjustment is performed on the data in accordance with the high-order bits. The data stored in the ROM has certain offset in advance in order to regenerate a sine wave accurately; however, the offset causes an error in output of the ROM. In order to compensate such an error, a correction calculation is performed on the data in accordance with the high-order bits. Moreover, in order to regenerate a cosine wave, sine/cosine-wave designation data are used to cooperate with the high-order bits of the input phase data. Thus, the circuit is capable of generating sine-wave data or cosine-wave data correctly with high precision, regardless of insufficient resolution of address due to the offset.

7 Claims, 2 Drawing Sheets

SINE-WAVE GENERATOR CIRCUIT

BACKGROUND OF THE INVENTION

The invention relates to sine-wave generator circuits which generate sine-wave data based on input phase data represented by twos complements.

One type of sine-wave generator circuits is designed to use a read-only memory (i.e., ROM) which stores sine-wave data, so that the sine-wave data (or cosine-wave data) are generated based on input phase data. This type of sine-wave generator circuits does not store sine-wave data with respect to an overall phase region between 0 and $2\pi$ because storage capacity of the ROM should be reduced. Instead, the sine-wave generator circuit stores sine-wave data with respect to a selected phase region between 0 and $\pi/2$, for example.

Suppose that one cycle of sine wave is divided into four sections which respectively correspond to four phase regions of 0 to $\pi/2$, $\pi/2$, to $\pi$ to $3\pi/2$ and $3\pi/2$ to $2\pi$. Each section of the sine wave can be represented by a curve having same curvature. Therefore, it is sufficient for the ROM to store only the sine-wave data in the phase region of 0 to $\pi/2$. So, sine-wave data of other phase regions can be easily obtained by adequately changing read addresses for the ROM as well as positive/negative signs of the sine-wave data which are read out from the ROM.

Input phase data are represented by twos-complement data in which each bit has a weight factor corresponding to phase. In the input phase data, a predetermined set of low-order bits are used as address data, whereas remaining high-order bits cooperate with sine/cosine-wave designation data to designate either a normal order or a reverse order, by which data are read out from the ROM, in accordance with the address data and in response to the phase region; and the high-order bits are also used to adjust phases of data read out from the ROM.

By the way, if sine-wave data of 0 to $\pi/2$, which are written into the ROM, are represented by mathematical expression of $\sin(n\pi/256)$ (where 'n' is an integer selected from numbers ranging from 0 to 127), the sine-wave data, which are read out from the ROM, may not indicate a sinusoidal waveform with accuracy. This is because one cycle of phase (2n) is not equally divided. According to the above example, the sinusoidal waveform in each phase region is represented as follows:

| | | | |
|---|---|---|---|
| (0 to $\pi/2$): | $f(n)$ | = | $ROM[n] = \sin(n\pi/256)$ |
| ($\pi/2$ to $\pi$): | $f(n_1)$ | = | $ROM[127 - n_1]$ |
| | | = | $\sin\{(127 - n_1)\pi/256\}$ |
| ($\pi$ to $3\pi/2$): | $f(n_2)$ | = | $-ROM[n_2]$ |
| | | = | $-\sin(n_2\pi/256)$ |
| ($3\pi/2$ to $2\pi$): | $f(n_3)$ | = | $-ROM[127 - n_3]$ |
| | | = | $-\sin\{(127 - n_3)\pi/256\}$ |

So, phase represented by the above equation for ($\pi/2$ to $\pi$) if $n_1=127$ should be equal to phase represented by the equation for ($\pi$ to $3\pi/2$) if $n_2=0$. Similarly, phase represented by the above equation for (0 to $\pi/2$) if $n=0$ should be equal to phase represented by the equation for ($3\pi/2$ to $2\pi$) if $n_3=127$.

In order to regenerate a sinusoidal waveform correctly, certain offset is applied to sampling phases in such a way that sine-wave data, which are written into the ROM, are represented by mathematical expression of $\sin\{(n+0.5)\pi/256\}$.

However, if the offset is applied to the sine-wave data, which are written into the ROM, in order to obtain output data representing a correct sinusoidal waveform, the offset will naturally cause an error in the output data. Theoretically, an error between the output data of the ROM and true data representing a true sine wave Is very small in the aforementioned example. Herein, a maximum error at positive side of the sine wave is represented by mathematical expression of $-\sin(0.5\pi/256)$; and a maximum error at negative side of the sine wave is represented by mathematical expression of $-\sin(0.5\pi/256)$. In addition, a phase error 'd' is set within a region represented by an inequality as follows:

$$-0.5\pi/256 \leq d \leq 0.5\pi/256$$

So, an absolute value of the phase error is smaller than '1'. Actually, however, the aforementioned example divides the phase region of 0 to $\pi/2$ by '128'; therefore, the error may largely depend on resolution of address. So, as a distance between consecutive data within the input phase data becomes larger, the error becomes larger correspondingly.

Further, if $n=0$, the output data of the ROM should be equal to zero. However, in the aforementioned example, data of $\sin(0.5\pi/256)$ should be outputted instead of zero data. This will lead to incorrect regeneration of a sine wave.

SUMMARY OF THE INVENTION

It is an object of the invention to provide a sine-wave generator circuit which is capable of outputting data representing a sinusoidal waveform correctly even if the resolution of address is insufficient.

The invention provides a sine-wave generator circuit which generates data representative of a sine wave on the basis of data stored in a ROM. Herein, the ROM stores sine-wave data of only a selected phase region between 0 and $\pi/2$, for example. The circuit receives input phase data which are represented by twos complements and whose low-order bits are used as address data for the ROM. Each bit of the input phase data is multiplied by a weight factor which is represented by $\pi/2^X$ (where 'X' is an integer). When reading out data from the ROM, a normal order or a reverse order for the address data is designated in accordance with high-order bits of the input phase data, so that data representative of other phase regions are generated based on output of the ROM. Then, phase adjustment is performed on the data, read out from the ROM, in accordance with the high-order bits of the input phase data. The data stored in the ROM has certain offset in advance in order to regenerate a sine wave accurately, wherein the offset is provided to perform waveform adjustment, however, the offset causes an error in output of the ROM. In order to compensate such an error, a correction calculation is performed on the data, read out from the ROM, in accordance with the high-order bits of the input phase data. Moreover, in order to regenerate a cosine wave, sine/cosine-wave designation data are used to cooperate with the high-order bits of the input phase data.

Thus, the circuit is capable of generating sine-wave data or cosine-wave data correctly with high precision, regardless of insufficient resolution of address due to the offset.

BRIEF DESCRIPTION OF THE DRAWINGS

These and other objects of the subject invention will become more fully apparent as the following description is read in light of the attached drawings wherein.

DESCRIPTION OF THE PREFERRED EMBODIMENT

Figure 1:
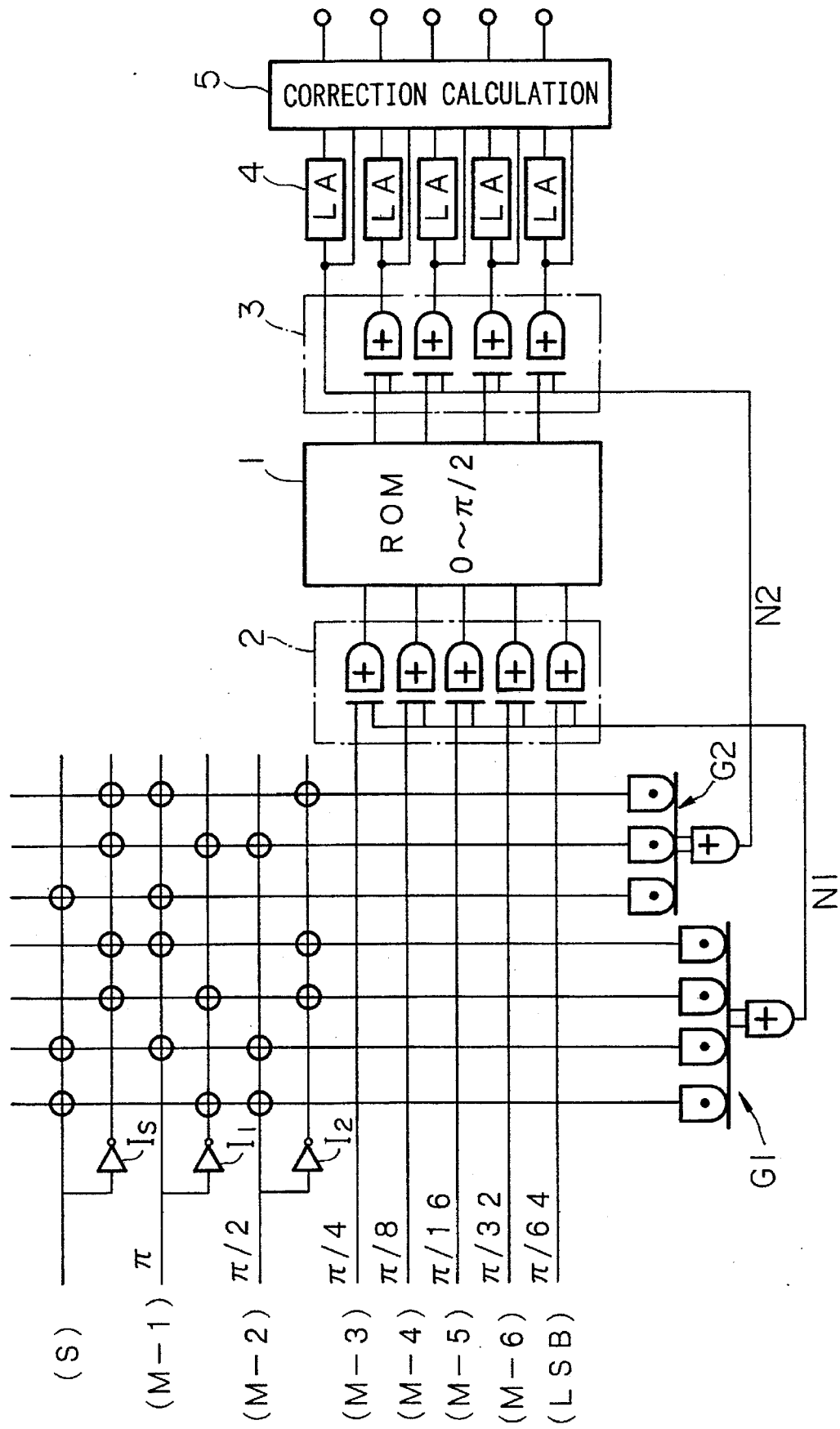
FIG. 1 is a block diagram showing a sine-wave generator circuit which is designed in accordance with an embodiment of the invention.

FIG. 1 is a block diagram showing a configuration of a sine-wave generator circuit which is designed in accordance with an embodiment of the invention.

Figure 2:
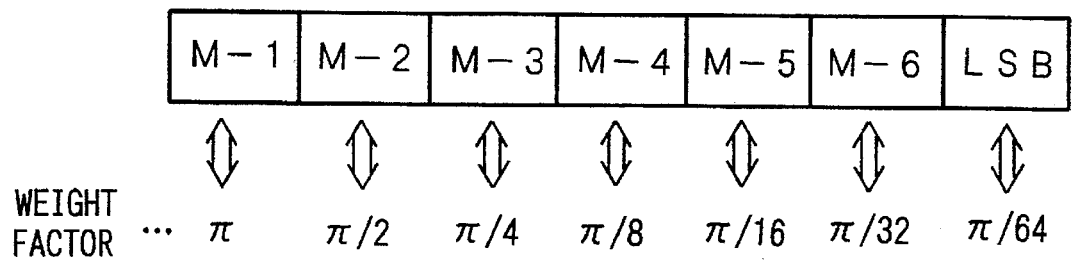
FIG. 2 is a drawing showing a configuration of input phase data together with weight factors.

In FIG. 1, a ROM 1 stores sine-wave data of 0 to $\pi/2$. Input phase data are twos-complement data of seven bits (M-1) to (LSB), each of which has a specific weight factor as shown by FIG. 2. For example, if the input phase data of seven bits are represented by a binary notation of '1110110', the data can be represented by a mathematical equation as follows:

$$1 \times \pi + 1 \times \pi/2 + 1 \times \pi/4 + 0 \times \pi/8 + 1 \times \pi/16 + 1 \times \pi/32 + 0 \times \pi/64 = 118\pi/64$$

In the embodiment, five low-order bits of (M-3) to (LSB) within the input phase data are used as address data. Relationship between address data, phases and output data (i.e., sine-wave data) is shown by TABLE 1.

TABLE 1

| ADDRESS | PHASE | OUTPUT DATA |
|---------|-------|-------------|
| 00 | 0~$\pi/64$ | sin ($\pi/128$) |
| 01 | $\pi/64$~$\pi/32$ | sin ($3\pi/128$) |
| 02 | $\pi/32$~$3\pi/64$ | sin ($5\pi/128$) |
| 03 | $3\pi/64$~$\pi/16$ | sin ($7\pi/128$) |
| . | . | . |
| . | . | . |
| . | . | . |
| 1D | $29\pi/64$~$15\pi/32$ | sin ($59\pi/128$) |
| 1E | $15\pi/32$~$31\pi/64$ | sin ($61\pi/128$) |
| 1F | $31\pi/64$~$\pi/2$ | sin ($63\pi/128$) |

TABLE 1 shows that a same set of the address and output data are used in each phase region. For example, an address 03 (represented by 5-bit data of '00011') and output data of sin($7\pi/128$) are sustained at any of phases within the phase region of $3\pi/64$ to $\pi/16$.

In order to regenerate a sine wave or a cosine wave of 0 to $2\pi$ based on sine-wave data of 0 to $\pi/2$ stored in the ROM 1, it is necessary to designate an appropriate data-read-out order or an appropriate sign of polarity. Such a manner of designation will be explained with reference to FIG. 3.

Figure 3:
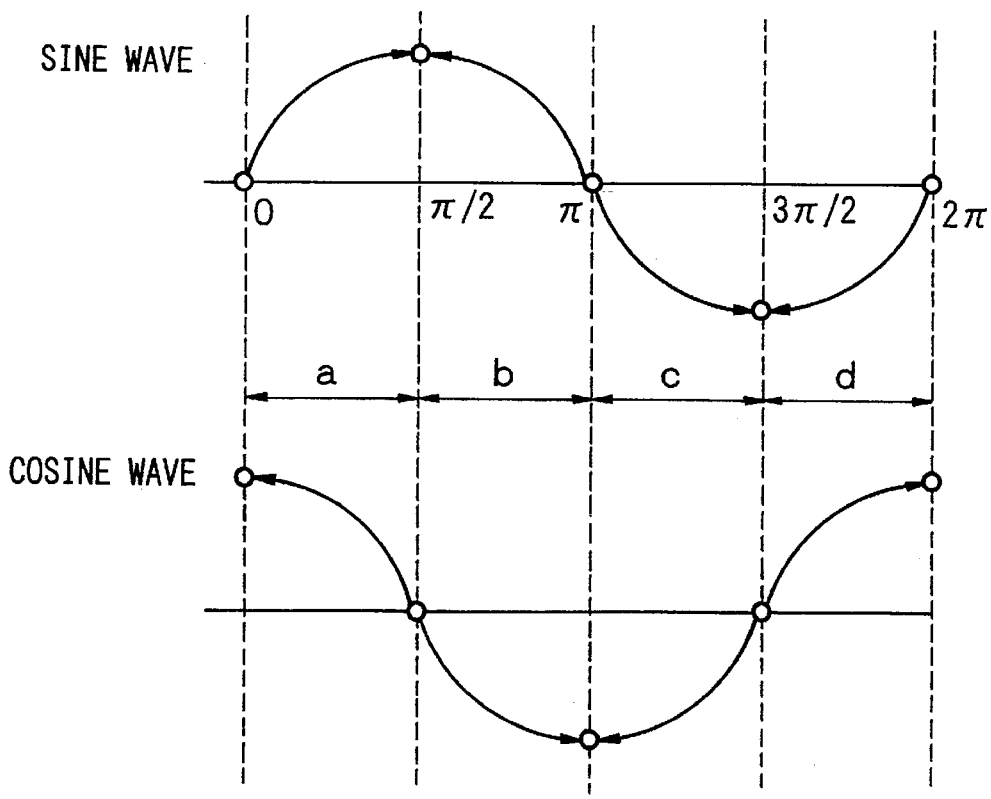
FIG. 3 shows graphs which are used to explain read-out operation for regeneration of a sine wave and a cosine wave.

As shown by FIG. 3, an overall phase region of 0 to $2\pi$ is divided into four sections which are denoted by numerals of 'a', 'b', 'c' and 'd' respectively. In FIG. 3, conditions of decision are described with respect to four phase regions respectively, wherein the conditions of decision are represented by combination of weight factors '$\pi$' and '$\pi/2$' and numbers '0' and '1'.

In addition, FIG. 3 shows data-read-out orders which are shown by arrows.

For example, if an output for the phase region b of $\pi/2$ to $\pi$ is produced in order to generate a sine wave, a data-read-out order of the phase region a of 0 to $\pi/2$ is reversed. In order to produce an output for the phase region c of $\pi$ to $3\pi/2$, data corresponding to the phase region a of 0 to $\pi/2$ are multiplied by '−1' so as to reverse its sign of polarity. In order to produce an output for the phase region d of $3\pi/2$ to $2\pi$, a data-read-out order is reversed simultaneously with reversing a sign of polarity.

In order to generate a cosine wave, data for the sine wave described above are changed such that a phase thereof progresses by '$\pi/2$'.

For decision of phase regions, combination between the weight factors $\pi$, $\pi/2$ and numbers '1', '0' is used. This corresponds to combination between two high-order bits (M-1) and (M-2) within the input phase data. In order to designate one of the sine wave and cosine wave, sine/cosine-wave designation data 'S' are inputted to the sine-wave generator circuit, independently of the input phase data. Herein, the sine wave is designated if S ='1'; and the cosine wave is designated if S ='0'.

In order to obtain appropriate logical production between the two high-order bits (M-1) and (M-2) and the sine/cosine-wave designation data S, there are provided two series of AND-gate circuits G1 and G2. In FIG. 1, a matrix is formed basically between eight horizontal lines (i.e., a line of (S) corresponding to the data S, lines of the bits (M-1) to (LSB)) and seven vertical lines (i.e., four input lines of the AND-gate circuit G1 and three input lines of the AND-gate circuit G2). And, several points of intersection (denoted by circles in FIG. 1) are formed between the lines of (S), (M-1), (M-2) and the input lines of the AND-gate circuits G1, G2, wherein two lines are connected at each point of intersection. Further, there are provided three inverters $I_s$, $I_1$ and $I_2$ which invert the data S and the bits (M-1), (M-2) respectively. So, several points of intersection are also formed between the lines of the inverters and the input lines of the AND-gate circuits G1, G2. The AND-gate circuit G1 performs a predetermined logical operation of AND on selected data at the points of intersection which are connected to the input lines thereof; and result of the logical operation is represented by an output 'N1' The output N1 of the AND-gate circuit G1 is supplied to a read-order designation circuit 2 which is provided prior to the ROM 1, wherein the output N1 acts as data which designate a read-address order for the ROM 1. The AND-gate circuit G2 performs a predetermined logical operation of AND on selected data at the points of Intersection which are connected to the input lines thereof; and result of the logical operation is represented by an output 'N2'. The output N2 of the AND-gate circuit G2 is supplied to a multiplier circuit 3 which is provided after the ROM 1, wherein the output N2 acts as data which designate multiplication of '−1'.

Operations of the above circuit elements will be described below with respect to a regional sine wave in the phase region of 0 to $\pi/2$, for example. Within the input phase data, both of the bits (M-1) and (M-2) are set at '0'; and the data S are at '1' According to the logic which is made by the matrix and the AND-gate circuits G1, G2, none of the outputs N1 and N2 cannot be turned to '1'; in other words, both of the outputs N1 and N2 are remained at '0'. In that case, a normal read-address order is designated; and the multiplication of '−1' is not designated. In short, outputs of the ROM 1 are directly presented.

The embodiment provides four conditions ①to ④ where the output N1 of the AND-gate circuit G1 is turned to '1', as follows:

① A sine wave is designated while $\pi$=0 and $\pi/2$=1.
② A sine wave is designated while $\pi$=1 and $\pi/2$=1.
③ A cosine wave is designated while $\pi$=0 and $\pi/2$=0.
④ A cosine wave is designated while $\pi$=1 and $\pi/2$=0.

Under each of the above conditions, the output N1 turns to '1', so that the read-order designation circuit 2 reverses its read-address order.

The embodiment provides three conditions ⑤ to ⑦ where the output N2 of the AND-gate circuit G2 is turned to '1', as follows:

⑤ A sine wave is designated while $\pi$=1.

⑥ A cosine wave is designated while π=0 and π/2=1.

⑦ A cosine wave is designated while π=1 and π/2=0.

Under each of the above conditions, the output N2 turns to '1'; and consequently, the multiplier circuit 3 activates the multiplication of '−1' so that output data of the ROM 1 are multiplied by '−1'.

In order to perform adjustment on a waveform, which is formed based on data stored in the ROM 1, the embodiment provides certain offset for each data of the ROM 1. However, provision of the offset results In occurrence of an output error of the sine-wave generator circuit. So, in order to compensate such an output error, the embodiment provides a correction calculation circuit 5 for the output data of the ROM 1. Details of the correction calculation circuit 5 will be described later, whereas basically the circuit 5 is designed to perform correction calculations using two output data of the ROM 1. In order to do so, there is provided a data-latch circuit 4 prior to the correction calculation circuit 5.

Next, fundamental principle in correction calculation will be described by using symbols 'A' and 'B', wherein 'A' represents input phase data as a whole while 'B' represents an internal section which is used as address data within the input phase data. Ideally, data representing mathematical expression of 'sin A' should be read out from the ROM 1. Actually, however, data representing mathematical expression of 'sin (B+π/N)' must be read out from the ROM 1. Herein, 'π/N' indicates the offset, wherein 'N' is an integer or can be represented by '$2^X$' (where 'X' is an integer).

To produce a value of 'A', an offset component should be removed from a value of 'B+π/N'; and a difference 'C' (where C=A−B) should be added to result of removal. That is, it is necessary to perform a calculation, as follows:

$$B + \pi/N - \pi/N + C = A$$

If the above calculation is employed, the mathematical expression of 'sin A' can be rewritten, as follows:

$$\begin{aligned}\sin A &= \sin\{(B+\pi/N) + (C-\pi/N)\} \\ &= \sin(B+\pi/N) \cdot \cos(C-\pi/N) + \\ &\quad \cos(B+\pi/N) \cdot \sin(C-\pi/N)\end{aligned} \quad (1)$$

Now, inequality of 'C−π/N <<1' is naturally established; therefore, a mathematical term of 'cos(C−π/N)' is approximated to '1' while a mathematical term of 'sin(C−π/N)' is approximated to 'C−π/N'. If the above approximation is employed, equation (1) can be rewritten to equation (2), as follows:

$$\sin A = \sin(B+\pi/N) + (C-\pi/N)\cos(B+\pi/N) \quad (2)$$

In the above equation (2), data representing mathematical terms of 'sin(B+π/N)' and 'cos(B+π/N)' respectively are data which can be read out from the ROM 1. So, the correction calculation circuit 5 performs calculation of the equation (2) using those data. That is, data representing 'sin(B+π/N)' and 'cos(B+π/N)' are sequentially read out from the ROM 1 as first data and second data. The first data, which are read out firstly, are retained by the data-latch circuit 4; and then, the second data together with the first data retained are used to perform the calculation of the equation (2) by the correction calculation circuit 5.

So, although the offset is imparted to data stored in the ROM 1 in advance, an output error, which is caused by a fact that only a part of the input phase data is used as the address data, can be corrected.

In order to generate data representing mathematical expression of 'cos A', the correction calculation circuit 5 performs a similar calculation based on the aforementioned principle. In case of 'cos A', equation (3) is used instead of the aforementioned equation (1), as follows:

$$\begin{aligned}\cos A &= \cos\{(B+\pi/N) + (C-\pi/N)\} \\ &= \cos(B+\pi/N) \cdot \cos(C-\pi/N) - \\ &\quad \sin(B+\pi/N) \cdot \sin(C-\pi/N)\end{aligned} \quad (3)$$

Like the aforementioned case of 'sin A', it is possible to employ approximation where 'cos(C−/N)' is approximated to '1' while 'sin(C−π/N)' is approximated to 'C−π/N' If the above approximation is employed, the equation (3) can be rewritten to equation (4), as follows:

$$\cos A = \cos(B+\pi/N) - (C-\pi/N)\sin(B+\pi/N) \quad (4)$$

That is, in order to generate data of 'cos A', the correction calculation circuit 5 performs the above equation (4) using data representing 'cos(B+π/N)' and 'sin(B+π/N)' which are read out from the ROM 1. So, it is possible to correct an output error in the case of 'cos A' as well.

By the way, the invention can be used for carrier tracking of modems. In the carrier tracking of modems, it is necessary to correct a shift between carrier frequencies at transmitter side and receiver side. Conventionally, even if an amount of phase correction for the carrier tracking is zero, an error should occur because a ROM used for generation of a sine wave has an offset. In order to eliminate such a problem, the invention is presented. In other words, if the amount of phase correction for the carrier tracking becomes zero, the invention works such that output data of the ROM after correction turns to zero. So, it is possible to obtain a high precision for the output data.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds are therefore intended to be embraced by the claims.

What is claimed is:

1. A sine-wave generator circuit comprising:
a memory for storing sine-wave data of a predetermined phase region, the memory being accessed using address data which correspond to low-order bits within input phase data represented by twos complements;
read-order designation means for designating either a normal order or a reverse order, by which data are read out from the memory based on the address data, in accordance with high-order bits within the input phase data;
phase adjustment means for performing phase adjustment on data read out from the memory in accordance with the high-order bits of the input phase data; and
correction calculation means for performing a correction calculation to correct an error of the data read out from the memory by using the high-order bits of the input phase data.

2. A sine-wave generator circuit according to claim 1, wherein if the input phase data, which as a whole are represented by 'A', consists of a section 'B', corresponding to the address data, and a remaining section 'C' (where C=A−B) while address offset is represented by π/N (where 'N' is an integer) so that data read out from the memory are represented by sin(B+πN) and cos(B+π/N), data representing a mathematical expression of 'sin A' are generated by performing a correction calculation, as follows:

$$\sin(B+\pi/N)+(C-\pi/N)\cdot\cos(B+\pi/N).$$

3. A sine-wave generator circuit according to claim 1, wherein if the input phase data, which as a whole are represented by 'A', consists of a section 'B', corresponding to the address data, and a remaining section 'C' (where C=A−B) while address offset is represented by π/N (where 'N' is an integer) so that data read out from the memory are represented by sin(B+πN) and cos(B+π/N), data representing a mathematical expression of 'cos A' are generated by performing a correction calculation, as follows:

$$\cos(B+\pi/N)-(C-\pi/N)\cdot\sin(B+\pi/N).$$

4. A sine-wave generator circuit according to claim 1 wherein the read-order designation means designates either the normal order or the reverse order in accordance with the high-order bits of the input phase data together with sine/cosine-designation data which designate either a sine wave or a cosine wave; and the phase adjustment means performs the phase adjustment in accordance with the high-order bits of the input phase data together with the sine/cosine-designation data.

5. A sine-wave generator circuit comprising:

means for receiving sine/cosine-designation data and input phase data of plural bits, each being multiplied by a weight factor, wherein the input phase data are represented by twos complements and predetermined number of low-order bits of the input phase data are used as address data;

a memory for storing data representing a selected phase region of a sine wave;

read-order designation means for designating either a normal order or a reverse order, by which data are read out from the memory based on the address data, in accordance with high-order bits of the input phase data and the sine/cosine-designation data;

phase adjustment means for performing phase adjustment on data read out from the memory in accordance with the high-order bits of the input phase data and the sine/cosine-designation data; and correction calculation means for performing a correction calculation to correct an error of the data read out from the memory In accordance with the high-order bits of the input phase data and the sine/cosine-designation data.

6. A sine-wave generator circuit according to claim 5 wherein the selected phase region of the sine wave corresponds to a phase range between 0 and π/2.

7. A sine-wave generator circuit according to claim 5 wherein each weight factor for each bit of the input phase data is represented by '$\pi/2^X$' (where 'X' is an integer).

* * * * *